United States Patent [19]

Caldwell

[11] 4,397,181

[45] Aug. 9, 1983

[54] METHOD FOR DETERMINING FLUID SATURATION IN A SUBSURFACE FORMATION

[75] Inventor: Richard L. Caldwell, Dallas, Tex.

[73] Assignee: Mobil Oil Corporation, New York, N.Y.

[21] Appl. No.: 295,058

[22] Filed: Aug. 21, 1981

[51] Int. Cl.³ .......................... G01V 1/40; E21B 49/00
[52] U.S. Cl. .................................... 73/152; 73/382 R; 73/155
[58] Field of Search ...................... 73/152, 155, 382 R

[56] References Cited

U.S. PATENT DOCUMENTS 4,052,893 10/1977 Murphy et al. ........................ 73/155

FOREIGN PATENT DOCUMENTS 802895 2/1981 U.S.S.R. ................................ 73/155

*Primary Examiner*—Howard A. Birmiel
*Attorney, Agent, or Firm*—Charles A. Huggett; Michael G. Gilman; George W. Hager

[57] ABSTRACT

A subsurface formation surrounding a borehole is flushed with at least one fluid having a density difference from that of the water content of the formation. Borehole gravity logs are recorded. Porosity is also recorded. From the density, gravity and porosity indications, water and oil saturation of the formation is determined.

11 Claims, No Drawings

METHOD FOR DETERMINING FLUID SATURATION IN A SUBSURFACE FORMATION

BACKGROUND OF THE INVENTION

This invention relates to a new and improved method for determining residual oil saturation in a subsurface formation surrounding a borehole by carrying out borehole gravity measurements in accordance with a log-inject-log operation.

The log-inject-log operation has been utilized with thermal neutron capture logs of subsurface formations to determine residual oil saturation. U.S. Pat. Nos. 3,748,474; 3,757,575; 3,812,353 and 3,825,752 all disclose such use. Theoretically, such residual oil saturation may be represented by the following expressions:

$$\Sigma_{formation} = \Sigma_{rock}(1-\phi) + \Sigma_{fluid}\phi \quad (1)$$

$$\Sigma_{fluid} = \Sigma_{oil}S_{oil} + \Sigma_{water}S_{water} \quad (2)$$

$$S_{oil} = 1 - S_{water} \quad (3)$$

where $\Sigma$ represents macroscopic absorption cross section,

S represents saturation (or volume fraction of a particular fluid in phase), and $\phi$ represents porosity.

In many instances the macroscopic absorption cross section of the rock matrix ($\Sigma_r$) cannot be known or estimated with good accuracy. Strongly absorbing trace elements are usually too abundant in the rock matrix to permit an accurate determination of $\Sigma_r$ from the rock's major constituents. The log-inject-log technique has been utilized to overcome this problem.

SUMMARY OF THE INVENTION

In accordance with the present invention there is provided a method for carrying out a log-inject-log operation in a formation surrounding a borehole. The formation is firstly flushed with a fluid having a density greater than that of the water present in the formation. A first borehole gravity log is then recorded of the flushed formation. The formation is secondly flushed with a fluid having a density greater than that of the water present in the formation and differing from that of the first fluid. A second borehole gravity log is then recorded of the flushed formation. The porosity of the formation is also measured. From the density, borehole gravity and porosity factors, the water and oil saturation of the formation is determined. However, in the event the pore water density is known or measurable prior to the log-inject-log operation, only a single flushing of the formation will be required with a borehole gravity log being recorded before and after the fluid injection of the single flushing operation.

The fluids injected to flush the formation may be brines of higher density then the formation water contents or immiscible hydrocarbons which do not affect the oil in place in the formation.

DESCRIPTION OF THE PREFERRED EMBODIMENT

In accordance with the present invention, there is provided a new and improved method for determining the fluid saturation characteristics of a subsurface formation from a log-inject-log operation. The method utilizes borehole gravity measurements made before and after injection into the formation of a fluid with density (i.e., specific gravity) different from that of the existing water in the formation.

The injected fluid may preferably be a brine of high salt content to yield a higher density fluid compatible with reservoir characteristics, such as reservoir fluids and clay surfaces. For example, an alternate fluid might be an immiscible hydrocarbon, that is, one which does not affect the oil in place in the reservoir. The formation is first flushed with a brine of known density. A first borehole gravity log is then recorded of the flushed formation. The formation is thereafter flushed with a brine of differing density. A second borehole gravity log is recorded. If both flushings are sufficient to achieve residual hydrocarbon saturation in all zones of interest, the two borehole gravity logs can be expressed generally as follows:

$$\rho_b = (1-\phi)\rho_{ma} + (\rho_w S_w + \rho_o S_o)\phi \quad (4)$$

where, $\phi$ = fractional porosity $\rho_b$ = formation density $\rho_{ma}$ = rock matrix density $\rho_w$ = pore water density $S_w$ = fractional water saturation $\rho_o$ = pore oil density $S_o$ = fractional oil saturation Letting $S_o = (1-S_w)$ and subtracting the first and second borehole gravity logs yields:

$$S_w = (\rho_{b1} - \rho_{b2})/\phi(\rho_{w1} - \rho_{w2}) \quad (5)$$

Since the borehole gravity log represents measurements in the tens of feet beyond the borehole, many pore volumes of injected brines, W1 and W2, are required to insure that formation water is completely displaced.

The borehole gravity log is a measure of the vertical component of the earth's gravitational field at selected depths in the borehole. The borehole gravity tool is stopped at each depth while gravity is measured. Knowing the distance between measurements, the formation bulk density is determinable as follows:

$$\rho b = \frac{F - (\Delta g/\Delta Z)}{4\pi G} \quad (6)$$

where

F = free air gradient.

$\Delta g$ = gravity difference between depth measurement points.

$\Delta Z$ = vertical distance between measurements.

G = universal gravitational constant.

Various logging tools and services are available in the industry for carrying out the borehole gravity measurements. One such logging service is provided by Exploration Data Consultants of Denver, Colo. This service of Exploration Data Consultants provides a radius of investigation approximately five times the distance between depth measurements points. For example an investigation depth of 100 feet will be provided for depth measurement points with 20 foot spacing. Consequently borehole effects, the influences of drilling fluid invasion and other normally detrimental factors become insignificant in borehole gravity meter logging. Further, the borehole gravity meter bulk density is generally more representative of the formation than that given by other logs.

In an alternate embodiment of the invention, only one formation flushing will be required if the pore water density of the formation surrounding the borehole is known or can be measured. Consequently, the density expression $\phi_{w1}$ of equation (5) above will relate to the known or measured pore water density and the density expression $\phi_{w2}$ of the same equation will relate to the pore water density after the single formation flushing with a fluid having a density differing from that of the known or measured pore water density. As before, such flushing fluid may be a brine with salt content so as to yield a higher density fluid than the exiting water content or an immiscible hydrocarbon which does not affect the oil in place in the formation.

It is to be understood that further modifications to the disclosed embodiment, may become apparent to one skilled in the art without departing from the scope and spirit of the invention as hereinafter defined by the appended claims.

What is claimed is:

1. A method for carrying out a log-inject-log operation in a formation surrounding a borehole having a drilling fluid invasion zone immediately surrounding the borehole, comprising the steps of:
   (a) flushing said formation to an extended distance beyond the drilling fluid invasion zone surrounding said borehole with a first fluid having a density greater than that of the water present in said formation,
   (b) recording a first borehole gravity log of said flushed formation,
   (c) flushing said formation to said extended distance beyond the drilling fluid invasion zone surrounding said borehole with a second fluid having a density greater than that of the water present in said formation and differing from that of said first fluid, and
   (d) recording a second borehole gravity log of said flushed formation.

2. A method for determining the fluid saturation condition of a subsurface formation surrounding a borehole, and having a drilling fluid invasion zone immediately surrounding the borehole comprising the steps of:
   (a) flushing said formation beyond said drilling fluid invasion zone with a first fluid of known density ($\rho_{w1}$),
   (b) recording a first borehole gravity log ($\rho_{b1}$) of the flushed formation,
   (c) flushing said formation beyond said drilling fluid invasion zone with a second fluid of known density ($\rho_{w2}$) differing from the density of said first fluid,
   (d) recording a second borehole gravity log ($\rho_{b2}$) of the flushed formation,
   (e) recording the porosity ($\phi$) of said subsurface formation, and
   (f) determining water saturation ($S_w$) in accordance with the following expression:

$$S_w = (\rho_{b1} - \rho_{b2})/\phi(\rho_{w1} - \rho_{w2}).$$

whereby the influence of the drilling fluid invasion immediately surrounding the borehole on the water saturation determination is minimized.

3. The method of claim 2 wherein said first and second fluids are brines with salt content so as to yield a higher density fluid than the existing water content of the formation.

4. The method of claim 2 wherein said first and second fluids are immiscible hydrocarbons which do not affect the oil in place in the formation.

5. A method for carrying out a log-inject-log operation in a formation of known water density surrounding a borehole, comprising the steps of:
   (a) recording a first borehole gravity log of said formation,
   (b) flushing said formation at least to the depth of investigation of said borehole gravity log with a fluid having a density differing from that of the water present in said formation, and
   (c) recording a second borehole gravity log of said flushed formation.

6. The method of claim 5 wherein said fluid is a brine with salt content so as to yield a higher density fluid than the existing water content of the formation.

7. The method of claim 5 wherein said fluid is an immiscible hydrocarbon which does not affect the oil in place in the formation.

8. The method of claim 5 wherein said depth of investigation is in the order of tens of feet.

9. The method of claim 8 wherein said depth of investigation is in the order of 100 feet.

10. The method of claim 5 wherein the depth of investigation is in the order of five times the distance between depth measurement points for the recordings of said first and second borehole gravity logs.

11. A method for carrying out a log-inject-log operation in a subsurface formation surrounding a borehole, comprising the steps of:
    (a) recording the pore water density of said subsurface formation,
    (b) recording the porosity of said subsurface formation,
    (c) recording a first borehole gravity log of said formation,
    (d) flushing said formation at least to the depth of investigation of said first borehole gravity log with a fluid having a density greater than said pore water density,
    (e) recording a second borehole gravity log of said first formation, and
    (f) determining water saturation from said density recordings, said borehole gravity log recordings and said porosity recording.

* * * * *

UNITED STATES PATENT AND TRADEMARK OFFICE
CERTIFICATE OF CORRECTION

PATENT NO. : 4,397,181

DATED : August 9, 1983

INVENTOR(S) : Richard L. Caldwell

It is certified that error appears in the above—identified patent and that said Letters Patent is hereby corrected as shown below:

Column 1, line 17, Equation (1) should read as follows:

$$\Sigma \text{ formation} = \Sigma \text{ rock } (1 - \phi) + \Sigma \text{ fluid } \phi$$

Signed and Sealed this

Twenty-ninth Day of November 1983

[SEAL]

Attest:

GERALD J. MOSSINGHOFF

Attesting Officer     Commissioner of Patents and Trademarks